(12) United States Patent
Stupachenko et al.

(10) Patent No.: US 10,740,217 B1
(45) Date of Patent: Aug. 11, 2020

(54) NON-NATIVE SYSTEM-LEVEL DEBUGGING USING SYMBOLIC INFORMATION

(71) Applicant: Parallels International GmbH, Schaffhausen (CH)

(72) Inventors: Andrey Stupachenko, Moscow (RU); Nikolay Dobrovolskiy, Moscow (RU); Serguei M. Beloussov, Singapore (SG)

(73) Assignee: PARALLELS INTERNATIONAL GMBH, Schaffhausen (CN)

(*) Notice: Subject to any disclaimer, the term of this patent is extended or adjusted under 35 U.S.C. 154(b) by 0 days.

(21) Appl. No.: 15/986,719

(22) Filed: May 22, 2018

(51) Int. Cl.
  *G06F 11/36* (2006.01)
  *G06F 9/54* (2006.01)
  *G06F 9/455* (2018.01)

(52) U.S. Cl.
  CPC ........ *G06F 11/362* (2013.01); *G06F 9/45558* (2013.01); *G06F 9/541* (2013.01); *G06F 9/542* (2013.01); *G06F 2009/45591* (2013.01)

(58) Field of Classification Search
  CPC .................................................. G06F 11/362
  USPC ........................................................ 717/124
  See application file for complete search history.

(56) References Cited

U.S. PATENT DOCUMENTS

| | | | |
|---|---|---|---|
| 6,637,024 B1* | 10/2003 | Johnson | G06F 11/3636 709/203 |
| 9,104,798 B2* | 8/2015 | Mohindra | G06F 11/3664 |
| 9,251,039 B2* | 2/2016 | Wu | G06F 11/3664 |
| 2004/0123271 A1* | 6/2004 | Bindewald | G06F 11/362 717/124 |
| 2010/0274551 A1* | 10/2010 | Das | G06F 9/45504 703/26 |
| 2014/0059547 A1* | 2/2014 | Wang | G06F 9/5077 718/1 |
| 2014/0173565 A1* | 6/2014 | Scholl | G06F 11/3664 717/124 |
| 2015/0033078 A1* | 1/2015 | Wintergerst | G06F 11/362 714/38.1 |
| 2015/0334126 A1* | 11/2015 | Mooring | G06F 9/45558 726/1 |
| 2018/0074843 A1* | 3/2018 | Smith | G06F 9/45558 |

* cited by examiner

*Primary Examiner* — Qing Chen
*Assistant Examiner* — Clint Thatcher
(74) *Attorney, Agent, or Firm* — Lowenstein Sandler LLP (57) ABSTRACT

A method may include establishing a connection between a debugger native to a host operating system and an agent of a virtual machine executing a guest operating system. The host operating system and the guest operating system are of different kernel types. The method may also include receiving, from the agent, information pertaining to the guest operating system. The method may also include performing, using the debugger on the host operating system, non-native system debugging of the guest operating system based on the information pertaining to the guest operating system.

19 Claims, 5 Drawing Sheets

FIG. 5

NON-NATIVE SYSTEM-LEVEL DEBUGGING USING SYMBOLIC INFORMATION

TECHNICAL FIELD

The present disclosure is generally related to computer systems, and is specifically related to non-native system level debugging using symbolic information.

BACKGROUND

Operating systems are system applications that manage computer hardware and software resources. Operating systems may operate as intermediaries for software resources to access the computer hardware, may schedule tasks efficiently, and the like. There are different kernel types of operating systems that have specific addresses, labels, names, and the like. Example kernel types may include Windows® by Microsoft® of Redmond, Wash., Mac® OS X® by Apple® of Cupertino, Calif., Linux®, and the like. When an operating system is installed on a computing system and manages the lowest level computing system resources directly, it may be referred to as native to that computing system. Each kernel type of operating system may be associated with a particular debugger (e.g., LLDB® for Mac OS X, WinDBG® for Windows, KDB® for Linux, etc.) that uses symbolic information pertaining to the associated operating system to perform one or more debugging operations. Conventionally, system-level debugging of an operating system is supported by a debugger native to that operating system using the specific symbolic information to assist the debugging process.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

A debugger may refer to a computer application that performs one or more debugging operations of another computer application. Although a debugger may be applied to any suitable computer application, in the present discussion the debugger is applied to operating systems. Debugging operations may refer to identifying and/or removing errors, potential errors, faults, risks, and the like in a computer application. Example debugging operations may include listing a current stack (backtrace) for an operating system, enumerating threads for a current process of the operating system, displaying information about any processor, writing internal system structures (e.g., interrupt tables, memory paging, etc.) of the operating system to memory, among other operations discussed below.

Debuggers installed on an operating system may run natively on that operating system. A computer application running natively on an operating system may refer to the ability of the computer application to run without an external layer assisting in execution of the computer application on the operating system. For example, LLDB is a debugger specific for Mac OS X kernel, and LLDB may support native symbol information specific to Mac OS X to assist a debugging process of the Mac OS X kernel.

Conventionally, a debugger (e.g., LLDB) that is native to a first operating system (e.g., Mac OS X) may not be enabled to perform non-native system level debugging of a second operating system (e.g., Windows) that has a different type (e.g., different kernel and symbol information) than the first operating system. However, in some scenarios, it may be desirable to perform system level debugging of the second operating system (e.g., Windows) using the debugger (e.g., LLDB) that is not native to the second operating system.

For example, some users may desire to use different operating systems for performing different functions. The user may desire to use Windows for running computer applications related to creating and/or editing of documents, spreadsheets, and/or slideshows, and to use Mac OS X for creating and editing of videos. Using virtual machines, it may be possible to utilize more than one operating system on the same computing device. A first operating system may be running on a computing device and a virtual machine may be instantiated on that computing device to run a second operating system where the first and second operating systems have differing kernel types. Alternatively, a user may use two separate computing devices that are running operating systems having differing kernel types to achieve their desired goals.

In some scenarios, it may be desired to perform non-native system level debugging of the second operating system (e.g., Windows) using a debugger (e.g., LLDB) that is native to the first operating system (e.g., Mac OS X). For example, an administrator or service technician using the first operating system may want to debug the second operating system that is used by another person (e.g., employee). Conventionally, the debugger may not allow using non-native symbolic information of the second operating system to debug the second operating system at a system level because the debugger is programmed to support the symbolic information of the first operating system. Symbolic information may refer to labels, function names, parameters, variable names, stack backtraces, object files responsible for sections of code in an executable, frame pointer optimization information, and so forth. Debugging without symbolic information of the second operating system prevents obtaining the correct labels, variable and function names, stack backtraces, and other useful information of the second operating system, thereby preventing debugging of the second operating system.

Accordingly, described herein are aspects of using a debugger that is native to a first operating system to perform non-native system level debugging of a second operating system using the symbolic information of the second operating system. The second operating system may have a different kernel type than the first operating system. In some embodiments, a computing device may execute a host operating system and a virtual machine may run a guest operating system that has a different kernel type than the host operating system. The debugger may be native to the host operating system and non-native to the guest operating system. The debugger may be enabled to use symbolic information of the guest operating system to achieve better productivity in debugging the guest operating system.

Although the description discusses debugging a kernel of the second operating system having a type of Windows using the LLDB debugger that is native to Mac OS X, it should be understood that any suitable operating system and debugger combination may be used to debug the second operating system using a debugger that is native to a first operating system and non-native to the second operating system. Additionally or alternatively, in some embodiments, similar results may be achieved for any other non-native system level debugging, including using physical computing devices instead of virtual machines, using the techniques described herein.

In some embodiments, a virtual machine may be instantiated on the host system running a host operating system and the virtual machine may be prepared to run a guest operating system that has a different kernel type than the host operating system. A debugger may be installed on and native to the first operating system, and the debugger may be non-native to the second operating system. An agent may be included in the virtual machine at instantiation or installed after the virtual machine is instantiated. The agent may be a computer application that operates as a server to the debugger (e.g., client) and may allow connections from the debugger into the virtual machine. The agent may provide basic information (e.g., raw values from memory and processor registers) to the debugger upon the occurrence of trigger events in the guest operating system.

Additionally, one or more scripts and/or plugin additions may be used by the debugger on the first operating system to interpret incoming information related to the second operating system from the agent and convert the incoming information into user friendly output or perform certain debugging operations. For example, to support non-native system level debugging of the guest operating system, the scripts for the debugger may access the symbolic information from a symbol server associated with the kernel type of the guest operating system. The scripts may use the information received from the agent to obtain the symbolic information and convert the symbolic information into symbolic names for any labels, variables and addresses, etc. Accordingly, the scripts may enable the debugger that is not native to the guest operating system to perform one or more debugging operations for the guest operating system using the symbolic names.

Thus, aspects of the present disclosure may be advantageous by enabling a debugger that is not native to a second operating system to provide a near native debugging experience of the second operating system. In some embodiments, the debugger on the first operating system may be executed at an early boot stage of the second operating system, when even a native debugger on the second operating system is unable to process. In some instances, using the non-native debugger may improve performance of the second operating system by enabling detection and correction of errors or potential errors of the second operating system via the debugger of the first operating system.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced disclosure are described in details herein below by way of examples, rather than by way of limitation.

Figure 1:
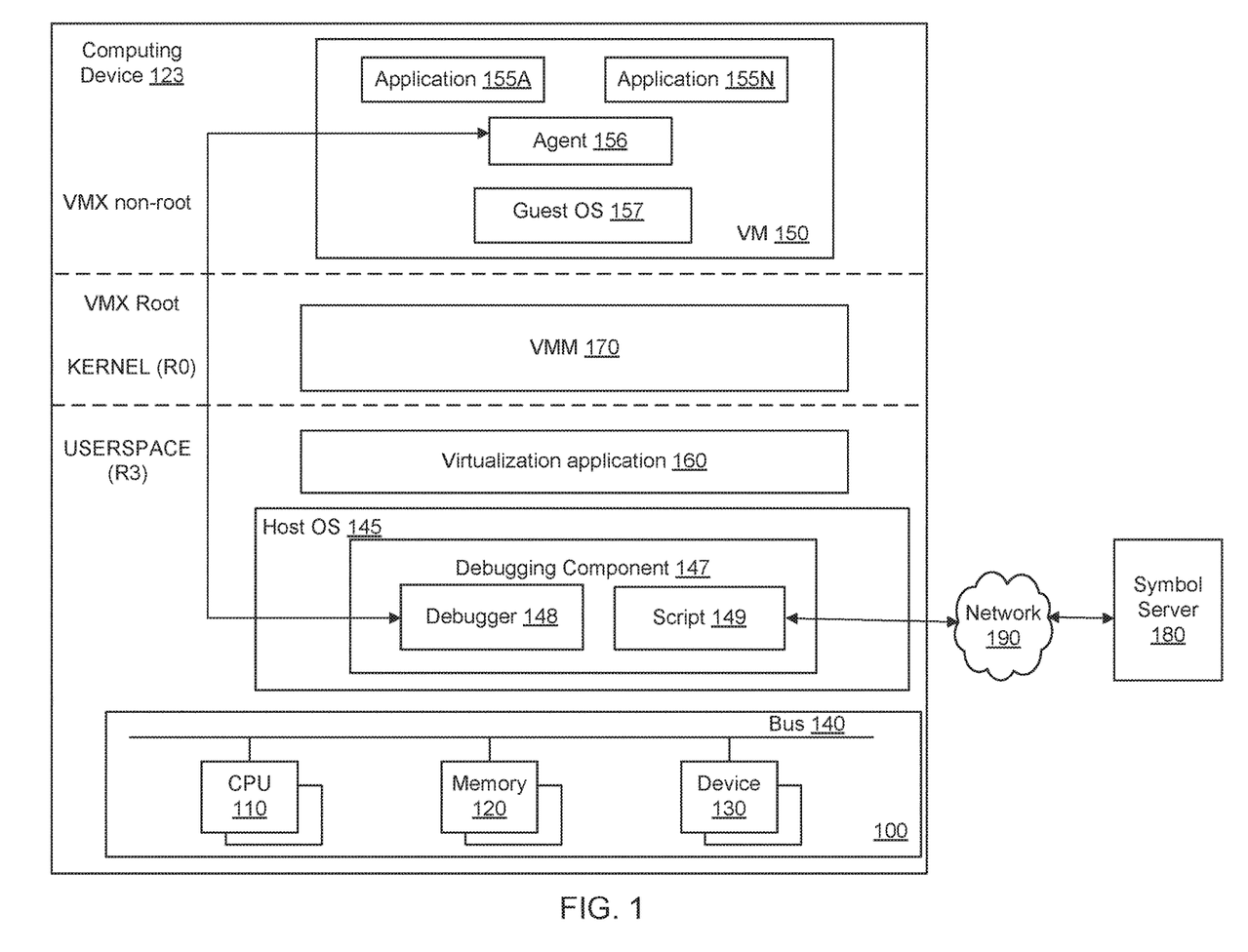
FIG. 1 depicts a high-level diagram of an example virtualized execution environment operating in accordance with one or more aspects of the present disclosure.

FIG. 1 depicts a high-level diagram of an example virtualized execution environment operating in accordance with one or more aspects of the present disclosure. The host system 100 may include one or more central processing units (CPU) 110, also referred to as "processing devices" herein, communicatively coupled to one or more memory devices 120 and one or more peripheral devices 130 via a system bus 140.

"Processing device" herein refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. A processing device may also be referred to as a central processing unit (CPU). "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices. Certain peripheral devices, such as flash memory cards, compact disks, HDDs, or SSDs, may be hot-pluggable to the host system. Insertion of such a peripheral device into a suitable interface (e.g., a Universal Serial Bus (USB) socket) of the host system may trigger mounting the peripheral device by the host operating system (OS) 145. Mounting the peripheral device may involve identifying the device type, installing and/or activating an appropriate device driver, and initializing the peripheral device by the host OS via the device driver.

The computer system 100 may implement a virtual execution environment. In some implementations, the virtual execution environment may execute software developed for a platform that is different from the native platform of the host system 100. In certain implementations, the virtual execution environment may be implemented using certain hardware-assisted virtualization features of the processing device 110, which may support executing, at an elevated privilege level, a VMM 170 that manages one or more virtual machines. In various implementations, the VMM 170 may be implemented as a kernel module, a kernel extension, a driver, or a part of the host OS 145.

The host OS 145 may further include a debugging component 147 that performs one or more debugging operations. In some implementations, the debugging component 147 may include a debugger 148 and one or more scripts 149. The debugger 148 may be implemented in computer instructions executable by the CPU 110 to perform one or more debugging operations. As described above, the debugger 148 may be configured to operate for a specific operating system (e.g., LLDB for Mac OS x, WinDBG for Windows, and KDB for Linux). Thus, conventionally, a debugger that is not native to an operating system may not perform system level debugging operations for that operating system using symbolic information of that operating system. Some implementations of the present disclosure may enable such non-native system level debugging with symbolic information, for example, by using the debugger 148 in conjunction with the one or more scripts 149, among other things described herein. The one or more scripts 149 may request symbolic information pertaining to a desired operating system from a symbol server 180 associated with the kernel type of the desired operating system.

Accordingly, the computing device 123 may be communicatively coupled to the symbol server 180 via a network 190. The network 190 may be a public network (e.g., the Internet), a private network (e.g., a local area network (LAN) or wide area network (WAN)), or a combination thereof. Network 190 may include a wireless infrastructure, which may be provided by one or more wireless communications systems, such as a wireless fidelity (WiFi) hotspot connected with the network 190 and/or a wireless carrier system that can be implemented using various data processing equipment, communication towers, etc. Additionally or alternatively, network 190 may include a wired infrastructure (e.g., Ethernet).

The VMM 170 may present a virtual machine 150 with an abstraction of one or more virtual processors, while retaining selective control of processor resources, physical memory, interrupt management, and input/output (I/O). A virtual machine 150 may implement a software environment which may be represented by a stack including a guest operating system (OS) 157 and one or more applications 155A-155N. Each virtual machine 150 may operate independently of other virtual machines and use the VMM-facilitated interface to the processors, memory, storage, graphics, and I/O provided by the host platform 100.

The virtual machine 150 may also include an agent 156. In some implementations, the agent 156 may be implemented as computer instructions executable by the CPU 110. The agent 156 may be included as part of the virtual machine 150 and may execute when the virtual machine 150 is instantiated by the host OS 145. In some implementations, the agent 156 may be included in the VMM 170. In some implementations, the agent 156 may be installed on the virtual machine 150 (e.g., when the virtual machine 150 is instantiated on a computing device different from the computing device 123). The agent 156 may operate as a server to the debugger 148 of the host OS 145. In such an instance, the debugger 148 may operate as a client to the agent 156 (e.g., server). The agent 156 may allow connections from the host debugger 148 into the virtual machine 150. The agent 156 may provide information pertaining to the guest OS 157 in response to identifying one or more triggering events (e.g., breakpoints, watchpoints, single steps, etc.) The information may include raw values from memory of the virtual machine 150, processor registers associated with the guest OS 157, and so forth. In some implementations, the agent 156 may execute one or more debugging operations of the guest OS 157 in the virtual machine 150, such as setting and removing breakpoints in computer instructions, setting and removing watchpoints in data, breaking and continuing execution, performing single steps, switching between virtual CPUs inside the virtual machine 150, reading and writing segment registers and general purpose registers, including floating point unit (FPU), streaming SIMD extensions (SSE), and advanced vector extension (AVX), and reading and writing virtual memory.

Initially, in some implementations, the virtual machine may be instantiated with a guest OS 157 (e.g., Windows) that has a different kernel type than the host OS 145 (e.g., Mac OS X). Upon instantiation, an option may be selected by the user to enable, via the agent 156, connecting the debugger 148 to the virtual machine 150. On the host OS 145, the debugger 148 (e.g., LLDB) that is native to the host OS 145 (e.g., Mac OS X) may be used as the debugger to perform non-native system level debugging of the guest OS 157. The debugger 148 may receive information pertaining to the guest OS 157 from the agent 156 upon the occurrence of the triggering events and may execute the scripts 149 to request symbolic information from the symbol server 180 based on the information pertaining to the guest OS 157. The scripts may obtain the symbolic information, parse the symbolic information, map the symbolic information to the information pertaining to the guest OS 157, and convert the information pertaining to the guest OS 157 to appropriate symbolic names associated with the guest OS 157.

The scripts may be written in any suitable programming language, such as Python, Java, C #, etc. In some implementations, the programming language of the scripts 149 may be selected based upon whether the programming language is a supported extension language for the debugger 148. That is, the scripts 149 may be executed by the debugger 148 without making internal changes to the debugger 148 itself. The scripts 149 may also be referred to as plug-ins for the debugger 148. Additionally or alternatively, the debugger 148 may be capable of performing the operations of the scripts itself without the use of additional scripts or plug-ins. The debugger 148 that is native to the host OS 145 and non-native to the guest OS 157 may use the symbolic names associated with the guest OS 157 to perform one or more debugging operations of the guest OS 157.

Example debugging operations of the guest OS 157 that are performed by the debugger 148 may include: presenting a kernel module list of the guest OS 157, presenting kernel module information of the guest OS 157, identifying an address by symbol of the guest OS 157, identifying a nearest symbol of the guest OS 157, presenting processes list of the guest OS 157, presenting thread (e.g., virtual CPU) list of the guest OS 157, presenting idle threads of the guest OS 157, presenting function entry of the guest OS 157, converting virtual address to a physical address of the guest OS 157, converting physical address to a virtual address of the guest OS 157, presenting memory contents of the guest OS 157, writing memory of the guest OS 157 to file (e.g., memory dump), presenting types of data of the guest OS 157, presenting process environment block of the guest OS 157, presenting thread environment block of the guest OS 157, presenting trap frame of the guest OS 157, presenting one process of the guest OS 157, presenting one thread of the guest OS 157, presenting current stack (e.g., backtrace) of the guest OS 157, switching execution of the guest OS 157 from a current thread (e.g., virtual CPU) to a specified thread (e.g., virtual CPU), and/or presenting information about any processor of a set of processors of the guest OS 157.

In some implementations, a virtual machine 150 may not be used, and instead, a different physical computing device running a different operating system that has a different kernel type than the operating system running on the computing device 123 may be used. The agent 156 may be installed on the different operating system of the different computing device and may operate similar to as described above, by establishing a connection between the debugger 148 native to the operating system of the computing device 123 and the agent 156 of the different operating system. The debugger 148 may perform non-native system level debugging of the different operating system similar to as described above regarding the implementation with the guest OS 157 of the virtual machine 150.

A transition from the VMM execution mode (also referred to as VMX root operation in certain processor architectures) to the guest execution mode (also referred to as VMX non-root operation) is referred to as a VM entry and may be performed by invoking a special Instruction Set Architecture (ISA)-dependent instruction (e.g., VMLAUNCH/VMRESUME or VMRUN instructions). The reverse transition, i.e., transition from the guest execution mode to the VMM execution mode is referred to as a VM exit and is initiated by the processing device in response to detecting one of the triggering events (such as an attempt to execute a certain privileged instruction or to access a certain memory address). Thus, when executed in the guest execution mode, certain instructions and events, instead of their ordinary operation, cause VM exits to the VMM 170. Because these VM exits modify the virtual processor's ordinary behavior, the functionality of software in the guest execution mode is limited by certain pre-configured restrictions for the code being executed. It is this very limitation that allows the VMM to retain the full control of processor resources and prevent the virtual machine from executing an operation that would corrupt the host state. Because the guest execution mode places restrictions even on software running on the virtual processor with the current privilege level (CPL) of zero, the guest software may run at the privilege level for which it was originally designed.

In the absence of hardware-assisted virtualization support by the processing device 110, binary translation may be implemented for translating instructions to be executed by the virtual machine 150 to the instruction set supported by the processing device 110 and/or for shifting the execution privilege levels in the guest execution mode.

In certain implementations, various virtual machine management functions (such as virtual machine creation, execution, and termination) may be performed by the virtualization application 160 running in a non-privileged execution mode in the user space of the host system 100. The virtualization application 160 may include a separate processing thread for each virtual processor (vCPU) of the virtual machine(s) 150. Within each thread, the virtualization application 160 may invoke the functions of the VMM 170 for performing the platform emulation or getting access to the run-time data of the virtual machine(s) 150. In certain implementations, the virtualization application 160 may further implement a GUI intercepting user input and displaying graphical output generated by the virtual machine 150.

Certain instructions executed and/or certain events occurring in the guest execution mode may cause VM exits, which are processed by the VMM 170, which may pass the VM exit reason and other relevant information to the virtualization application 160, which thus exercises control over the execution of the virtual machine 150.

Figure 2:
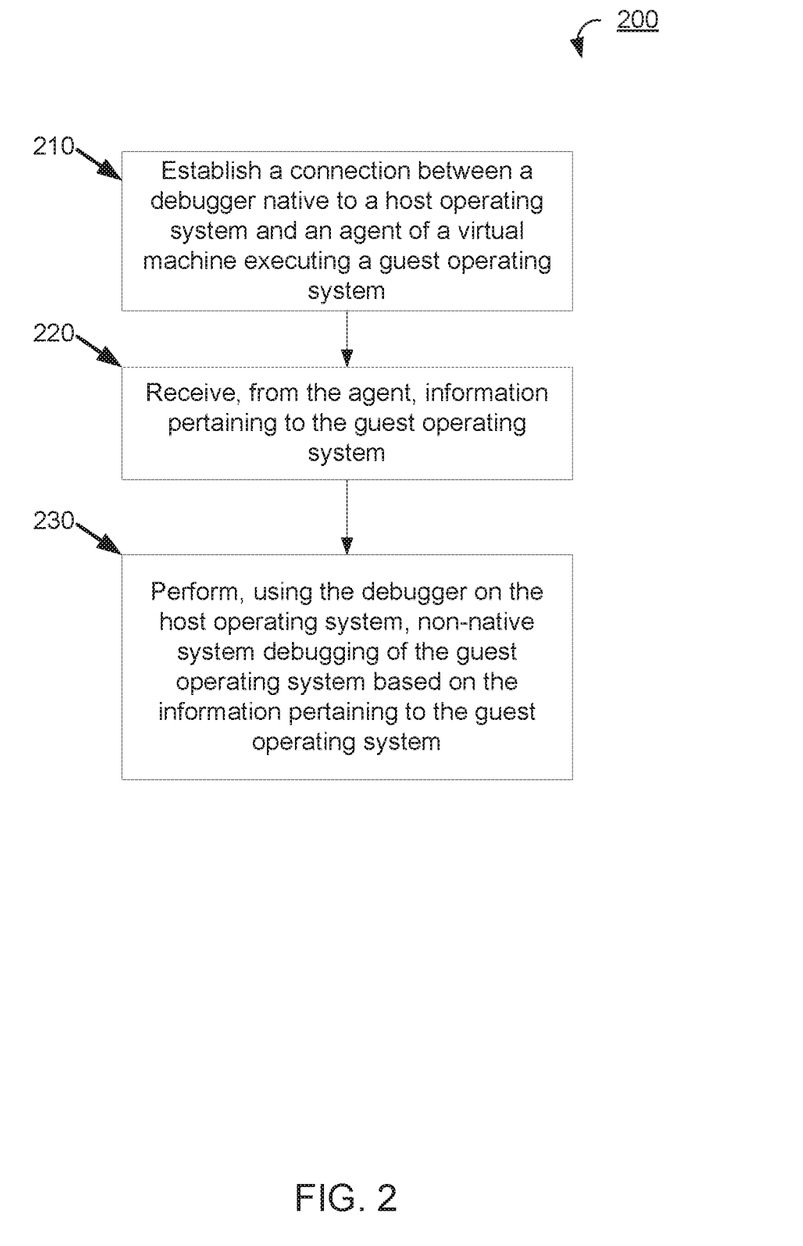
FIG. 2 depicts a flow diagram of one illustrative example method of performing non-native system level debugging in accordance with one or more aspects of the present disclosure.

FIG. 2 depicts a flow diagram of one illustrative example of a method 200 of performing non-native system level debugging of the guest OS 157 using the debugger 148 native to the host OS 145. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 may be performed by the debugging component 147 of FIG. 1.

At block 210, a processing device may establish a connection between the debugger 148 that is native to the host OS 145 and the agent 156 of the virtual machine 150 executing the guest OS 157. The debugger 148 may be non-native to the guest OS 157. The host OS 145 may cause the virtual machine 150 including the agent 156 to be instantiated on the computing device 123 via the VMM 170, and the virtual machine 150 may execute the guest OS 157 that has a different kernel type than the host OS 145. In some implementations, the virtual machine 150 including the agent 156 may be instantiated on a different computing device besides the computing device 123, and the established connection may enable remote non-native system level debugging of the guest OS 157 executing on the virtual machine 150 on the different computing device. Further, in some implementations, a virtual machine may not be used, and instead, a second computing device running a second operating system may be debugged via a debugger native to a first operating system running on a first computing device using the debugger on the first computing device in communication with the agent 156 on the second computing device.

The processing device may receive an input of a selection of an option to enable connecting the virtual machine 150 to the debugger 148 via the agent 156 when the virtual machine 150 is instantiated. The agent 156 may operate as a server to the debugger 148 by enabling a connection from the debugger 148 into the virtual machine 150 and by providing information pertaining to the guest OS 157 of the virtual machine 150 to the debugger 148.

The agent 156 may identify and/or detect certain triggering events of the guest OS 157 and send the information pertaining to the guest OS 157 to the debugger 148. The triggering events may include breakpoints in computer instructions executed by the guest OS 157, watchpoints in data of the guest OS 157, single steps of the guest OS 157, and so forth. The triggering events that are monitored by the agent 156 may be configurable, and the initial triggering events detected by the agent 156 may be configured by a developer of the agent 156.

At block 220, a processing device may receive, from the agent 156, the information pertaining to the guest OS 157. The information pertaining to the guest OS 157 may include raw values from memory of the guest OS 157, processor registers of the guest OS 157, and the like. In some embodiments, the information may also include a label of the guest OS 157, a variable of the guest OS 157, an address of the guest OS 157, etc.

At block 230, a processing device may perform, using the debugger 148 on the host OS 145, non-native system level debugging of the guest OS 157 based on the information pertaining to the guest OS 157. The debugger 148 may use the one or more scripts 149 with the information pertaining to the guest OS 157 to perform the non-native system level debugging of the guest OS 157, as described further below with reference to FIG. 3. The one or more debugging operations may include one or more of listing a current stack of the guest OS 157, enumerating threads for a current process of the guest OS 157, listing processes of the guest OS 157, displaying information about any processor of the guest OS 157, writing internal system structures of the guest OS 157 to memory, converting addresses of the guest OS 157, and/or switching execution from a first thread of the guest OS 157 to a second thread of the guest OS 157, among others discussed herein.

Figure 3:
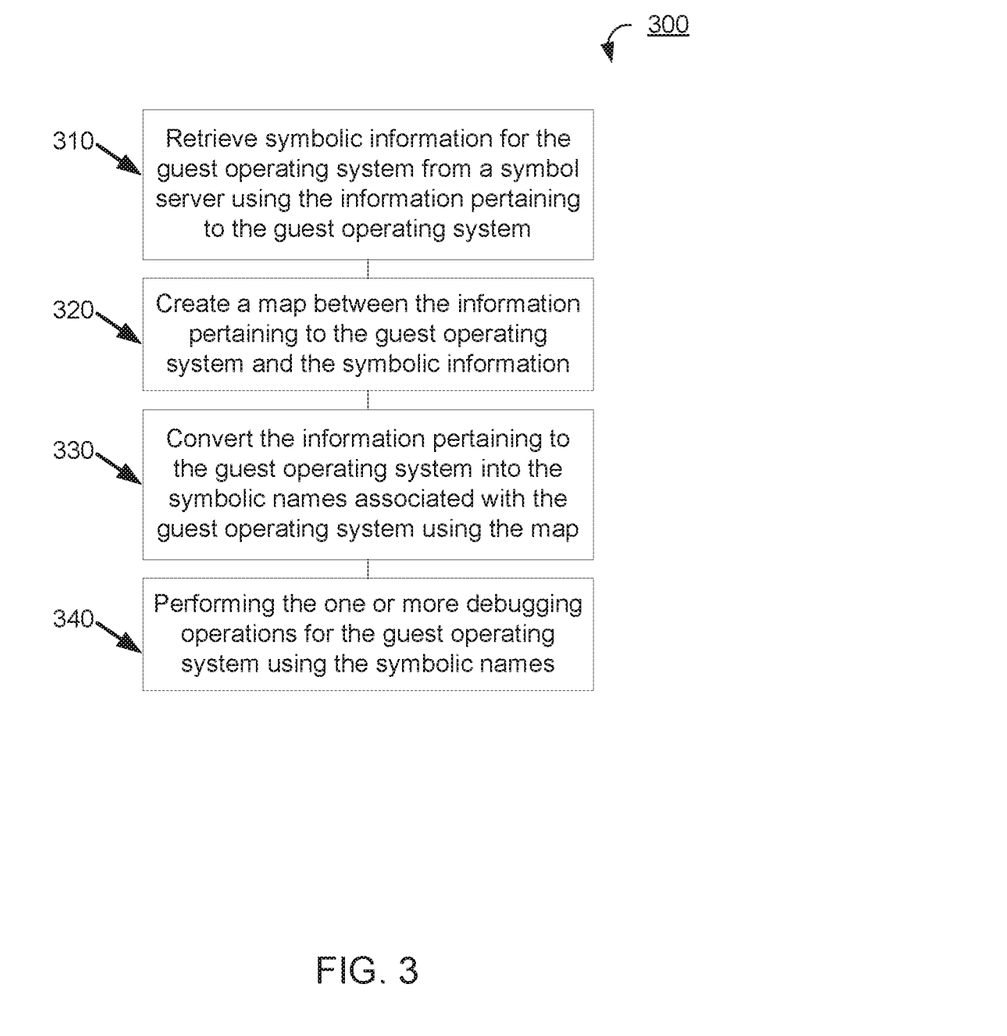
FIG. 3 depicts a flow diagram of one illustrative example method of obtaining symbolic information for a guest operating system to use in debugging operations of the guest operating system in accordance with one or more aspects of the present disclosure.

FIG. 3 depicts a flow diagram of one illustrative example of method 300 of obtaining symbolic information for the guest OS 157 to use in debugging operations of the guest OS 157 by the debugger 148 that is non-native to the guest OS 157, in accordance with one or more aspects of the present disclosure. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 may be performed by debugging component 147 of FIG. 1. For example, some operations of method 300 may be performed by the debugger 148 or the scripts 149. Further, method 300 may include operations that are executed as part of block 230 of the method 200 in FIG. 2.

At block 310, the processing device may retrieve symbolic information for the guest OS 157 from the symbol server 180 using the information (e.g., raw values from memory, processor registers, labels, variables, and/or addresses of the guest OS 157) pertaining to the guest OS 157. The symbol server 180 may include symbolic information related to a particular type of kernel (e.g., Windows, Mac OS X, Linux, etc.). Thus, the processing device may select a symbol server 180 depending on the kernel type of the guest OS 157 for which the information pertaining to the guest OS 157 was received from the agent 156. The processing device may operate as a client and request the symbolic information from the symbol server 180 by passing the information pertaining to the guest OS 157.

The symbol server 180 may identify the symbolic information associated with the information pertaining to the guest OS 157 in one or more data stores of the symbol server 180 and return the symbolic information to the processing device. The processing device may parse the symbolic information received from the symbol server 180. The symbolic information may include symbols and symbolic names associated with the information pertaining to the guest OS 157.

At block 320, the processing device may create a map between the information pertaining to the guest OS 157 and the symbolic information. For example, the processing device may create a map between the guest OS's addresses, variables, procedures, etc. and their symbolic names and/or symbols included in the symbolic information.

At block 330, the processing device may convert the information pertaining to the guest OS 157 into symbolic names associated with the guest OS 157 using the map. Additionally, the map may be used when it is desired to output symbolic names, instead of raw addresses or input names from a user, of the information pertaining to the guest OS 157. By using the symbolic names associated with the guest OS 157, system level debugging of the guest OS 157 by the debugger 148 that is not native to the guest OS 157 may be enabled because the debugger 148 may be enabled to reference and identify internal structures of the guest OS 157 when performing debugging operations.

At block 340, the processing device may perform the one or more debugging operations for the guest OS 157 using the symbolic names, symbols, and/or the like. For example, the processing device may list backtraces of the guest OS 157, enumerate threads (e.g., vCPUs) for current processes of the guest OS 157, switch between processors to execute the guest OS 157, dump internal system structures (e.g., interrupt tables, memory paging, etc.) of the guest OS 157, and so forth.

Figure 4:
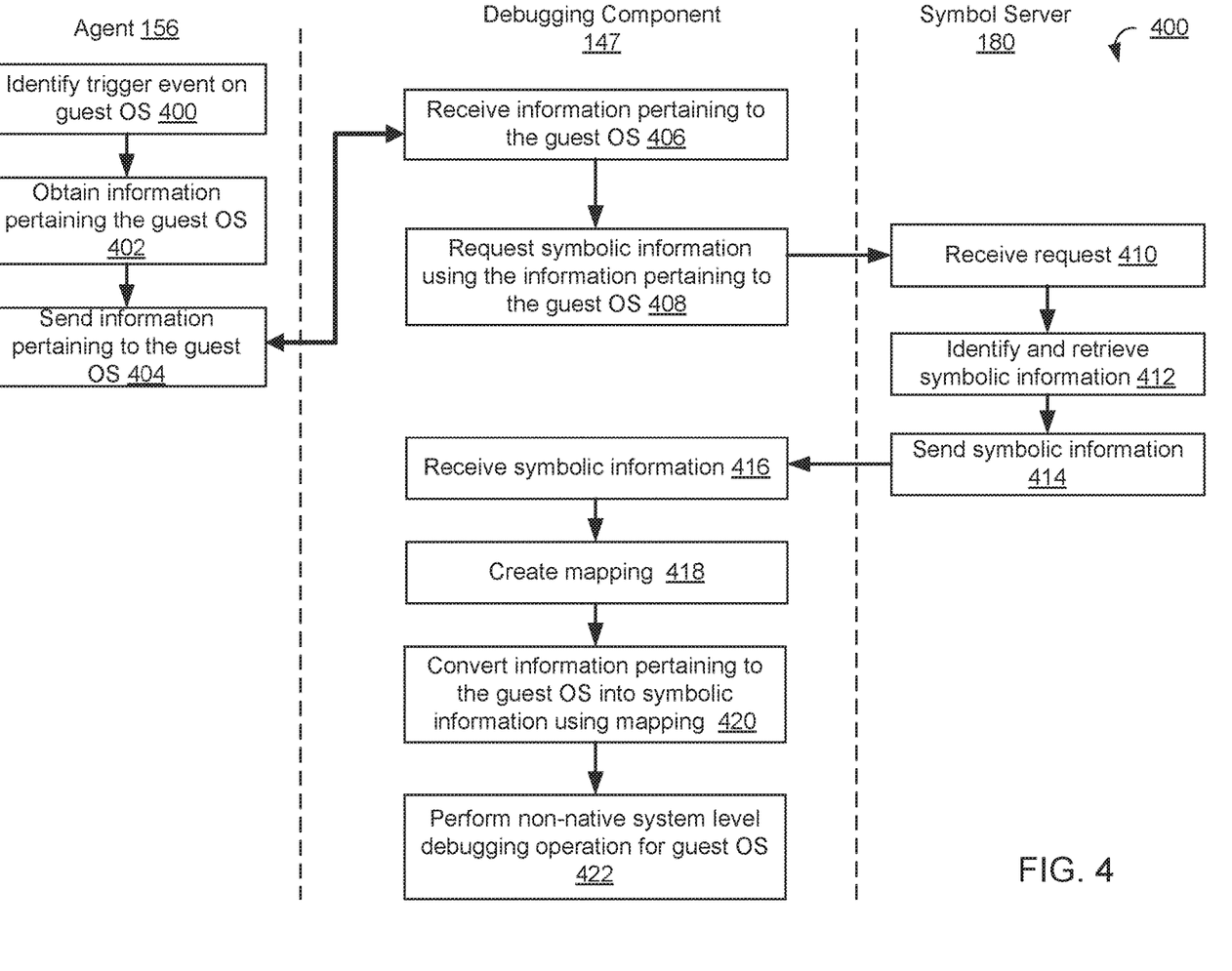
FIG. 4 is a sequence diagram of one illustrative example of performing non-native system level debugging in accordance with one or more aspects of the present disclosure.

FIG. 4 is a sequence diagram 400 of one illustrative example of performing non-native system level debugging of a guest OS 157 using symbolic information of the guest OS 157. The sequence diagram 400 includes operations performed by the agent 156 of the virtual machine 150 running the guest OS 157, the debugging component 147 (e.g., the debugger 148 and the scripts 149), and the symbol server 180. It should be understood that the debugging component 147 may be native to the host OS 145 and non-native to the guest OS 157 executing on the virtual machine 150. The operations may be implemented as computer instructions stored on a non-transitory, computer readable media and executable by one or more processing devices.

At block 400, the agent 156 may identify a trigger event of the guest OS 157. The agent 156 may be monitoring the guest OS 157 and waiting for a trigger event to occur. The trigger events may include breakpoints in computer instructions of the guest OS 157, watchpoints for data of the guest OS 157, single steps of the guest OS 157, and the like. At block 402, the agent 156 may obtain information pertaining to the guest OS 157 in response to the trigger event. The information may be obtained from one or more files, logs, memory locations, applications, commands, or the like. The information pertaining to the guest OS 157 may include basic information such as raw values from memory of the guest OS 157, processor registers of the guest OS 157, and the like. At block 404, the agent 156 may send the information pertaining to the guest OS 157 to the debugging component 147 via a connection established between the debugging component 147 and the agent 156. As such, the agent 156 may operate as a server of the information pertaining to the guest OS 157 to the debugging component 147 that may operate as a client to the agent 156.

At block 406, the debugging component 147 may receive the information pertaining to the guest OS 157 from the agent 156. At block 408, the debugging component may request symbolic information for the information pertaining to the guest OS 157 from the symbol server 180. In some implementations, the scripts 149 may send the request for the symbolic information using the information pertaining to the guest OS 157. Additionally or alternatively, the debugger 148 may send the request.

At block 410, the symbol server may receive the request from the debugging component 147. The symbol server 180 may include symbolic information pertaining to the kernel type of the guest OS 157. At block 412, the symbol server 180 may identify and retrieve symbolic information (e.g., symbolic names, symbols, etc.) from one or more data stores of the symbol server 180. At block 414, the symbol server 180 may send the symbolic information associated with the information pertaining to the guest OS 157 to the debugging component 147.

At block 416, the debugging component 147 may receive the symbolic information associated with the information pertaining to the guest OS 157 from the symbol server 180. At block 418, the debugging component 147 may parse the symbolic information (e.g., symbols, symbolic names, etc.) and create a mapping between the information (e.g., raw values, processor registers, variables, procedures, addresses, etc.) pertaining to the guest OS 157 and their respective symbolic information. At block 420, the debugging component 147 may convert the information pertaining to the guest OS 157 into the symbolic names and/or symbols using the mapping. At block 422, the debugging component 147 may perform one or more non-native system level debugging operations for the guest OS 157 using the symbolic information associated with the information pertaining to the guest OS 157.

Figure 5:
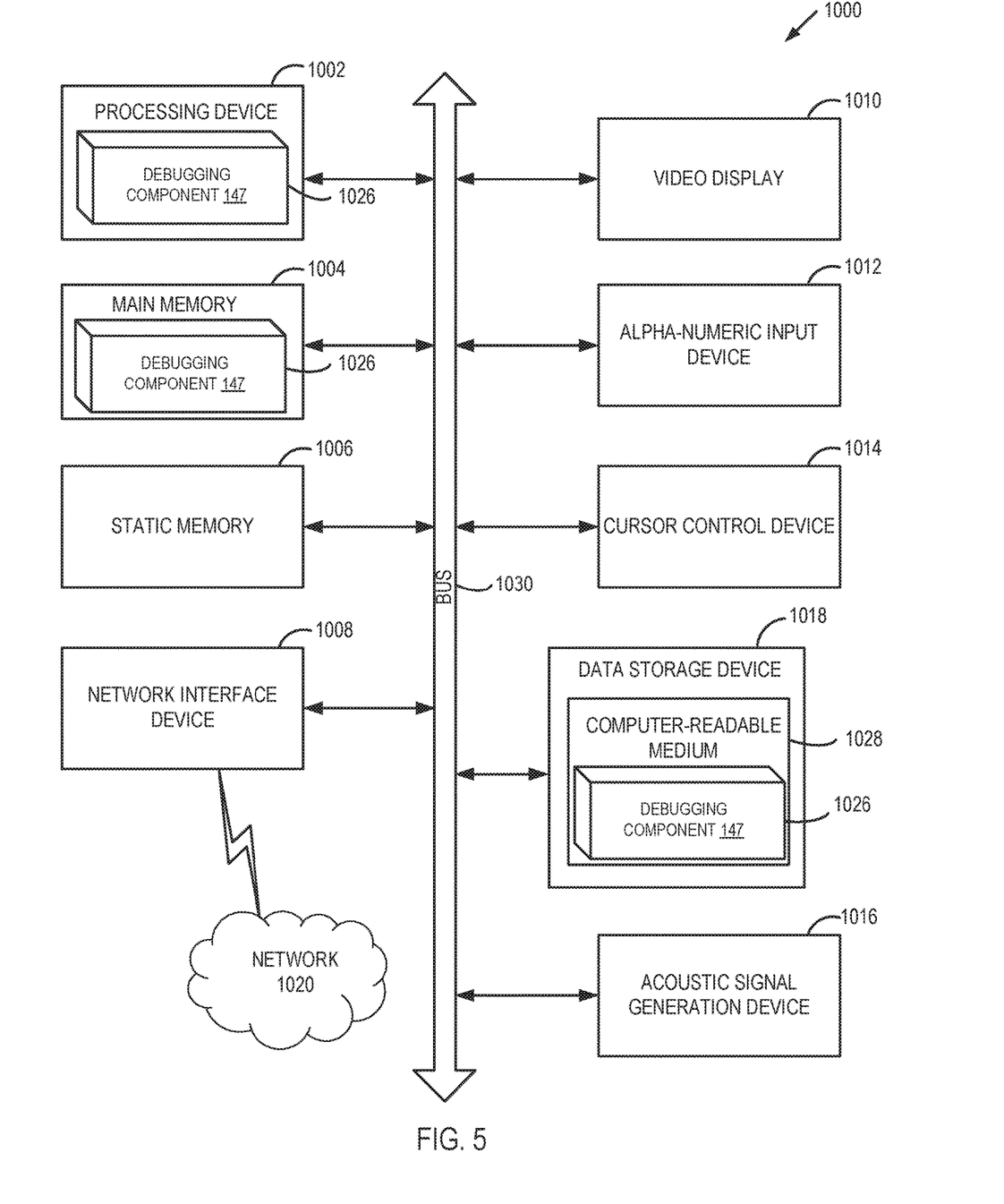
FIG. 5 schematically illustrates a component diagram of an example computer system which may perform any one or more of the methods described herein.

FIG. 5 schematically illustrates a component diagram of an example computer system 1000 which may perform any one or more of the methods described herein. In various illustrative examples, computer system 1000 may represent example computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 200, 300 of creating a communication channel from a host OS to a guest OS.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of debugging component 147.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    establishing a connection between a debugger native to a host operating system and an agent of a virtual machine executing a guest operating system, wherein the host operating system and the guest operating system are of different kernel types, and wherein the debugger is non-native to the guest operating system;
    receiving, from the agent, information pertaining to the guest operating system, wherein the information pertaining to the guest operating system is in a first format not supported by the debugger native to the host operating system;
    selecting a symbol server based on a kernel type of the guest operating system, wherein the symbol server comprises symbolic information associated with the kernel type of the guest operating system;
    retrieving symbolic information for the guest operating system from the symbol server using the information pertaining to the guest operating system;
    converting the information pertaining to the guest operating system into a symbolic format that is supported by the debugger native to the host operating system based on the symbolic information; and
    performing, using the debugger on the host operating system, non-native system debugging of the guest operating system based on the information pertaining to the guest operating system converted into the symbolic format.

2. The method of claim 1, wherein performing, using the debugger on the host operating system, non-native system debugging of the guest operating system based on the information pertaining to the guest operating system further comprises:
    creating a map between the information pertaining to the guest operating system and the symbolic information, wherein the symbolic information includes symbols and symbolic names for the symbols;
    converting the information pertaining to the guest operating system into the symbolic names associated with the guest operating system using the map; and
    performing one or more debugging operations for the guest operating system using the symbolic names.

3. The method of claim 1, wherein the information pertaining to the guest operating system is received from the agent responsive to the agent detecting one or more events occurring in the guest operating system.

4. The method of claim 2, wherein the one or more debugging operations comprise one or more of listing a current stack of the guest operating system, enumerating threads for a current process of the guest operating system, listing processes of the guest operating system, presenting information about any processor of the guest operating system, writing internal system structures of the guest operating system to memory, converting addresses of the guest operating system, or switching execution from a first thread of the guest operating system to a second thread of the guest operating system.

5. The method of claim 1, wherein the information pertaining to the guest operating system comprises one or more of a label of the guest operating system, a variable of the guest operating system, or an address of the guest operating system.

6. The method of claim 1, further comprising causing the virtual machine to be instantiated and to execute the guest operating system.

7. The method of claim 6, further comprising receiving an input of a selection of an option to enable connecting the virtual machine to the debugger.

8. The method of claim 1, wherein the host operating system and the virtual machine executing the guest operating system are installed on a first computing device.

9. The method of claim 1, wherein the host operating system is installed on a first computing device, and the virtual machine executing the guest operating system are installed on a second computing device.

10. A system comprising:
    a memory; and
    a processing device, operatively coupled with the memory, to:
        establish a connection between a debugger native to a host operating system and an agent of a virtual machine executing a guest operating system, wherein the host operating system and the guest operating system are of different kernel types, and wherein the debugger is non-native to the guest operating system;
        receive, from the agent, information pertaining to the guest operating system, wherein the information pertaining to the guest operating system is in a first format not supported by the debugger native to the host operating system;
        select a symbol server based on a kernel type of the guest operating system, wherein the symbol server comprises symbolic information associated with the kernel type of the guest operating system;
        retrieve symbolic information for the guest operating system from the symbol server using the information pertaining to the guest operating system;
        convert the information pertaining to the guest operating system into a symbolic format that is supported by the debugger native to the host operating system based on the symbolic information; and
        perform, using the debugger on the host operating system, non-native system debugging of the guest operating system based on the information pertaining to the guest operating system converted into the symbolic format.

11. The system of claim 10, wherein to perform, using the debugger on the host operating system, non-native system debugging of the guest operating system based on the information pertaining to the guest operating system, the processing device is further to:
   create a map between the information pertaining to the guest operating system and the symbolic information, wherein the symbolic information includes symbols and symbolic names for the symbols;
   convert the information pertaining to the guest operating system into the symbolic names associated with the guest operating system using the map; and
   perform one or more debugging operations for the guest operating system using the symbolic names.

12. The system of claim 10, wherein the information pertaining to the guest operating system is received from the agent responsive to the agent detecting one or more events occurring in the guest operating system.

13. The system of claim 11, wherein the one or more debugging operations comprise one or more of listing current stack of the guest operating system, enumerating threads for a current process of the guest operating system, listing processes of the guest operating system, presenting information about any processor of the guest operating system, dumping internal system structures of the guest operating system, converting addresses, or switching execution of from a first thread of the guest operating system to a second thread of the guest operating system.

14. The system of claim 10, wherein the information pertaining to the guest operating system comprises one or more of a label of the guest operating system, a variable of the guest operating system, or an address of the guest operating system.

15. A non-transitory computer-readable storage medium comprising executable instructions that, when executed by a processing device, cause the processing device to:
   establish a connection between a debugger native to a host operating system and an agent of a virtual machine executing a guest operating system, wherein the host operating system and the guest operating system are of different kernel types, and wherein the debugger is non-native to the guest operating system;
   receive, from the agent, information pertaining to the guest operating system, wherein the information pertaining to the guest operating system is in a first format not supported by the debugger native to the host operating system;
   select a symbol server based on a kernel type of the guest operating system, wherein the symbol server comprises symbolic information associated with the kernel type of the guest operating system;
   retrieve symbolic information for the guest operating system from the symbol server using the information pertaining to the guest operating system;
   convert the information pertaining to the guest operating system into a symbolic format that is supported by the debugger native to the host operating system based on the symbolic information; and
   perform, using the debugger on the host operating system, non-native system debugging of the guest operating system based on the information pertaining to the guest operating system converted into the symbolic format.

16. The non-transitory computer-readable storage medium of claim 15, wherein to perform, using the debugger on the host operating system, non-native system debugging of the guest operating system based on the information pertaining to the guest operating system, the processing device is further to:
   create a map between the information pertaining to the guest operating system and the symbolic information, wherein the symbolic information includes symbols and symbolic names for the symbols; and
   convert the information pertaining to the guest operating system into the symbolic names associated with the guest operating system using the map; and
   perform one or more debugging operations for the guest operating system using the symbolic names.

17. The non-transitory computer-readable storage medium of claim 15, wherein the information pertaining to the guest operating system is received from the agent responsive to the agent detecting one or more events occurring in the guest operating system.

18. The non-transitory computer-readable storage medium of claim 16, wherein the one or more debugging operations comprise one or more of listing current stack of the guest operating system, enumerating threads for a current process of the guest operating system, listing processes of the guest operating system, presenting information about any processor of the guest operating system, dumping internal system structures of the guest operating system, converting addresses, or switching execution of from a first thread of the guest operating system to a second thread of the guest operating system.

19. The non-transitory computer-readable storage medium of claim 15, wherein the information pertaining to the guest operating system comprises one or more of a label of the guest operating system, a variable of the guest operating system, or an address of the guest operating system.

* * * * *